T864022

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 29, 1969

864 O.G. 1407

812,841

PHOTOGRAPHIC MATERIALS STABILIZED WITH OXYPENTAMIDINE AND TETRAAZAINDENE ANTIFOGGANTS

Dorothy J. Beavers and William F. Smith, both % Kodak Park Division, Rochester, N.Y. 14650

Filed Apr. 2, 1969. Published July 29, 1969
**Int. Cl. G03c *1/34***
U.S. Cl. 96—109
No Drawing. 14 Pages Specification

Photographic silver halide emulsions and elements containing a development modifier which is (A) a substantially non-vulcanizable linear polymer containing at least three linear thioether atoms and having a molecular weight of at least about 250, or (B) an onium salt comprising a quaternary ammonium, quaternary phosphonium or ternary sulfonium salt group, are stabilized against fog with a combination of (1) an oxypentamidine having the formula:

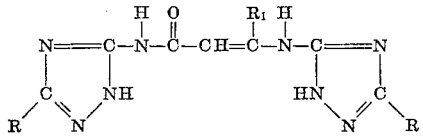

where each R is hydrogen or alkyl and $R_1$ is hydrogen, alkyl or aryl, e.g., 3,3′-bis(1,2,4-triazoyl-3)-2-methyl-4-oxo-1,5-diazapentene-2 with (2) a 4-hydroxy-6-alkyl-1,3,3a,7-tetraazaindene antifoggant, e.g., 4-hydroxy-6-methyl-1,3,3a,7-tetraazaindene. Examples of specific development modifiers include linear condensation products of diols such as 3-thiapentane-1,5-diol with dibasic acids such as glutaric acid and 7,18-diaza-6,19-dioxotetracosane-1,24-bis(pyridinium perchlorate).

Silver halide emulsions and elements stabilized as described can be chemically sensitized, e.g., with noble metal sensitizers alone or in combination with sulfur or selenium sensitizers. They can contain spectral sensitizers, incorporated color forming couplers, incorporated developing agents, other antifoggants, hardeners, plasticizers, coating aids, and other suitable photographic addenda, such as described in U.S. Patent 3,297,446 (columns 4–9).